United States Patent Office

3,701,678
Patented Oct. 31, 1972

3,701,678
FILM FOR LAYER CHROMATOGRAPHY
Hubert Rossler, Herbert Halpaap, and Knut Klatyk, Darmstadt, Germany, assignors to Merck Patent Gesellschaft mit beschrankter Haftung, Darmstadt, Germany
No Drawing. Filed Feb. 20, 1970, Ser. No. 13,197
Claims priority, application Germany, Feb. 21, 1969,
P 19 08 695.4
Int. Cl. B44d 1/14; B01d 15/08
U.S. Cl. 117—69                                14 Claims

ABSTRACT OF THE DISCLOSURE

Coated films suitable for layer chromatography are obtained by applying the adsorbent coating to a polyester or other flexible plastic film whose surface is covered with a thin coherent coating of polymeric titanium dioxide and/or polymeric zirconium dioxide.

BACKGROUND OF THE INVENTION

It is conventional to use plastic films coated with adsorbents in layer chromatography. Plastic films exhibit considerable advantages in layer chromatography over conventional substrate materials, e.g., glass plates, aluminum foils, and cardboard laminated with aluminum foil. Plastic films are mechanically resistant to breakage; they can readily be divided into smaller sections; they are flexible and transparent or translucent; they are suitable for documentation; they can be manufactured relatively simply by means of a continuous machine process; and they can also be employed in electrophoresis because of their insulating properties. The transparency of the support films is of special advantage because it facilitates the detection of even minor amounts of chromatographed substance. It thus is possible to conduct a quantitative evaluation of the thin-layer chromatogram by transillumination. However, coating of the plastic films with the chromatographic adsorbent causes some difficulties, since the surfaces of most plastic films are hydrophobic, and most of the adsorbents are customarily applied in the aqueous phase. Moreover, due to the flexibility of the substrate, the adhesive power of the adsorbent must meet special requirements.

Another disadvantage of the adsorbent-coated plastic films known heretofore, especially of the polyester films which are frequently employed, is the tendency of many eluents conventionally employed in chromatography, to dissolve significant amounts of monomers and oligomers, and in certain cases also plasticizers, stabilizers, catalysts, or other additives out of the substrate films, which interferes with the development of the chromatograms. Such substances are liberated from the entire surface along which the eluent moves. Normally, these substances then accumulate in the proximity of the solvent front. This phenomenon has a particularly troublesome effect when the adsorbent layer contains fluorescent indicators which are excited by ultraviolet light. When, during the development of the chromatogram, materials are dissolved from the plastic film, this can cause a decrease in the original fluorescence intensity over the entire developing surface, whereas beneath the eluent front, a wide zone of complete UV extinction can occur. It can be seen that as a result of the impurities leached from the plastic, the chromatographically separated substances cannot be eluted as pure compounds. Moreover, the analytical detection of substances exhibiting Rf-values of over 0.7 can become impossible. This undesired effect becomes especially noticeable when the plastic surface has been pretreated by chemical reaction or by mechanical processing in order to improve its adhesive properties.

An additional, especially important advantage of the thus-pretreated plastic film resides in that the above-mentioned advantageous properties of the adhesive backing for a predominantly inorganic adsorbent layer, e.g., silica gel or aluminum oxide, are obtained by means of a likewise inorganic layer. The previously known pretreated films for layer chromatography always exhibited substantial disadvantages because of their organic components.

SUMMARY OF THE INVENTION

According to this invention, the disadvantages of plastic film layer chromatography can be overcome by coating the surface of the plastic substrate, prior to the application of the chromatographic adsorbent layer, with a thin, coherent layer of an oxide of an element of Group IVb of the periodic table, preferably polymeric titanium dioxide and/or polymeric zirconium dioxide.

OBJECTS OF THE INVENTION

It is an object of this invention to provide a film suitable for layer chromatography consisting of a flexible plastic film substrate whose surface is coated with a thin, coherent coat of polymeric titanium dioxide and/or zirconium dioxide and a chromatographic adsorbent layer adhering thereto.

It is another object to provide a process for the production of such layer chromatography films.

Other objects will be apparent to those skilled in the art to which this invention pertains.

DETAILED DESCRIPTION OF THE INVENTION

The metallic oxide coatings produced in accordance with this invention are polymeric oxides of Group IVb metals, preferably titanium and zirconium dioxide aquates, which are substantially present in the X-ray-amorphous form. See, for example, O. Glemser, "Angewandte Chemie" [Applied Chemistry], 1961, pp. 785–805, especially page 786. However, for the sake of simplicity, they are generally called metallic oxide layers.

One can also employ the corresponding oxides of other Group IVb metals, e.g., hafnium, but the manufacture of such oxide films generally is not economical. Polymeric titanium dioxide is preferred.

Such oxide coatings seal the surfaces of the plastic films employed as the substrate for chromatographic layers in such a manner that the monomers and oligomers, as well as any additional interfering substances contained in the substrate, no longer pass from the plastic substrate into the adsorbent layer to a significant extent. Surprisingly, these oxide layers also increase the stability of the plastic against degradation reactions, which can be caused, for example, thermally, hydrolytically, oxidatively, etc. The substrate surface of the film, by being sealed with the polymeric oxide coatings, is markedly less sensitive to attack by heat, UV radiation, steam, acids, and bases. Since such attacks are possible in film layer chromatography, it was expected, with the previously known layer chromatography films, that additional degradation reactions of the plastic occurring during the chromatography mould lead to an increase in the components dissolved out of the plastic film. This disadvantage is substantially eliminated from the oxide coated films of this invention.

It was also found that sealing the plastic substrate film with such oxide coats additionally effects an improvement in the adhesive properties of the substrate surface for the chromatography adsorbent layer. As a result, a substantially wider range of possibilities is created in the choice of binders, which in most cases are required because of the flexibility of the substrate films, both as to the type and the amount added. For example, it is possible to reduce the amount of binders which, although effecting good adhesion of the adsorbent to the substrate, exhibit undesired properties with respect to the chromatography, or omit them entirely. In many cases, it is thus possible to obtain improved properties of the layer chromatography films, especially with respect to the time of the chromatographic runs.

The films according to this invention are produced in two steps. First, the plastic film is provided, in a conventional manner, with the protective coherent coating of the polymeric oxide. Thereafter, the layer of chromatographic adsorbent optionally provided with additional binders, is applied thereto. Since the dissolution of undesired substances is prevented, adhesives and/or binders can be employed having more favorable properties, or they can be employed in smaller amounts, and the film is protected against the effects of coloring reagents.

The application of the oxide layer is effected in a conventional manner. The protective layer can either be applied by sputtering, i.e., vacuum deposition, or, more advantageously, it can be formed on the surface film by hydrolysis of organotitanates and/or organozirconates applied thereto.

Any hydrolyzable ester of ortho-titanic or zirconic acid can be employed. These esters can be in the monomeric or also in the polymeric form. Preferred are those esters who alkyl group is that of a relatively volatile alcohol and thus can be removed after hydrolysis easily and substantially completely by evaporation. Most readily obtainable are the alkyl esters containing up to about 12 carbon atoms, preferably from 1 to 4 carbon atoms, e.g., n-butyl titanate, the most preferred, and also propyl, isopropyl, and tert.-butyl titanate, as well as the corresponding alkyl zirconates, and mixtures of these compounds. Good coatings can also be produced using, for example, the menthyl esters, the linaloyl esters, and the cyclohexanyl esters.

The esters are preferably applied to the film in an inert, substantially anhydrous organic solvent. Preferred solvents are volatile organic solvents, e.g., lower-aliphatic alcohols, such as methanol, ethanol, propanols and butanols, hydrocarbons, e.g., hexane, cyclohexane, and low-boiling petroleum ethers (boiling range up to about 150° C.). It is also possible to employ aromatic solvents, such as benzene, toluene, xylene and other hydrocarbons, and chlorinated hydrocarbons, e.g., carbon tetrachloride, chloroform, methylene chloride, and trichloroethylene.

In order to produce a coherent, adherent oxide coating of the desired quality, specific concentrations should be maintained for the solutions of these esters to be employed. It is advantageous to apply solvent solutions to the films having concentrations of the ester of about 0.01 to 0.5 mol./l., preferably 0.05–0.1 mol/l.

The ester solvent solution is applied to the surface of the plastic as a relatively thin coat and then dried. This can be done, for example, at room temperature by simply allowing the solvent to evaporate. However, it is also possible to employ higher temperatures in order to accelerate the drying process. The drying temperatures are dependent on the type of the solvent employed. They normally will not exceed 150° C. These temperatures are furthermore limited by the resistance of the selected plastic film to the effects of heat. In case of higher boiling solvents, it is, of course, necessary to employ higher temperatures. The ester solution can be applied, for example, by dipping, spreading, spraying, rolling, or otherwise customary techniques. In this connection, the plastic film can be coated with the protective coat on both sides or also only on the side which is to subsequently be coated with the adsorbent. Coating on both sides is advantageous, especially when the finished, adsorbent-coated films are placed on top of each other or are rolled into a roll, since direct contact between the adsorbent and an uncoated surface of the film is thereby avoided.

Simultaneously with or, advantageously, subsequently to the drying step, the hydrolysis step is conducted, by means of which the oxide coating is formed from the metal ester. In most cases, it is advantageous to first remove the solvent completely by evaporation, and thereafter conduct the hydrolysis. The hydrolysis can be conducted in a conventional manner at room temperature, as well as at higher temperatures, e.g., up to 150° C. When the hydrolysis step is combined with the drying step, the coating of solvent solution which was applied is allowed to dry gradually in the air in the presence of moisture. The relative atmospheric humidity in these cases should be at least 30%. Hydrolysis can be effected with steam, e.g., by applying steam or passing steam therethrough. In many cases, it is adavntageous to effect the hydrolysis in a closed chamber under controlled conditions of the temperature and moisture, since this is the simplest way to ensure the formation of a uniform coherent adherent coating.

The thickness of the oxide layer can be regulated by the amount and/or concentration of the ester solution and also, in part, by the hydrolysis conditions which are selected. If necessary, several layers can be applied on top of each other. In this manner, a thin, coherent, and firmly adhering oxide coat is obtained on the surface of the plastic. The thickness of this oxide layer is microscopic, i.e., usually below $1\mu$, preferably about 5–100 $m\mu$. Since a layer of this thickness can be measured only with extreme difficulty, the thickness of the layer is suitably determined by the amount of ester applied per 1,000 m.$^2$ of coated film, which is usually an amount which will provide at least 5 g./1,000 m.$^2$ of $TiO_2$ or $ZrO_2$ per 1,000 m.$^2$ of film substrate. Generally, the coating is applied at a rate of about 5–2,000 g., preferably 30–100 g., of $TiO_2$ or 5–3,000 g., preferably 40–150 g., of $ZrO_2$, per 1,000 m.$^2$ of plastic film.

Generally, an oxide layer of less than $1\mu$ is required to prevent the oxide layer from cracking or flaking off the film substrate when the latter is flexed and a layer at least 5 $m\mu$ is usually required to achieve a substantial improvement in inertness of the film substrate to the conditions and/or reagents employed in layer chromatography. However, under some conditions, somewhat thicker or thinner layers are effective.

The thus-produced oxide coating is relatively hydrophilic after the hydrolysis. It becomes increasingly drier upon aging or by the effect of higher temperatures, due to the beginning polymerization. The oxide layer finally becomes insoluble in both water and organic solvents.

After the oxide layer becomes insoluble, any desired adsorbent can be applied to the thus-prepared film substrate in a conventional manner. This is normally done, as is known, by coating with an aqueous slurry or a suspension of the adsorbent. The adsorbents most frequently employed are silica gels, kieselguhr, aluminum oxides, magnesium oxide, silicates, such as, for example, magnesium trisilicate, phosphates, such as, for example, tertiary calcium phosphate, molecular sieves, such as, for example, natural or synthetic zeolites, polyamides, cellulose, cellulose derivatives, as well as inorganic or organic ion exchangers. The adsorbent can also contain additives, for example, conventional binders and indicators, particularly fluorescence indicators. The type and composition of the adsorbent layer are, of course, not limited in any way by the oxide coating of this invention. Rather, it is possible to employ all adsorbents, additives and auxiliary agents, as they are required in each case for a chromatographic problem.

For the application of the adsorbents, conventional coating techniques and devices can be employed, for example, spreaders, rolls, spraying devices, etc. It is important, when applying the adsorbents, that the protective coat on the plastic film is not damaged. On damaged spots, the undesired effect of the uncoated film reappears, viz., substances which can interfere with the chromatography are dissolved from the plastic film during the chromatography.

The layer thickness of the adsorbents on the film can be those customarily employed in thin-layer chromatography, e.g., about between 5 and 2,000$\mu$, preferably about 50–250$\mu$. It is, of course, possible to apply any desired thicker layer.

The plastic film employed as the substrate is preferably a polyester film, especially a polyethylene terephthalate film. Other plastics, for example, the polyolefins, e.g., polyethylene and polypropylene, the polyamides, polytetrafluoroethylene, polytrifluorochloroethylene, vinyl polymers, e.g., polyacrylic acid and polymethacrylic acid derivatives, and cellulose or cellulose derivatives, can also be used.

The particular film employed is not critical because coating it with the metallic oxide coat according to this invention satisfactorily seals the substrate film. Thus, the advantage of this invention is independent of the nature of the substrate film.

The thickness of the substrate film normally ranges between 5 and 500$\mu$, and is preferably about 50–200$\mu$. The thickness of the plastic films is not critical to the invention and accordingly can be varied within very wide limits, if necessary. Basically, it would, of course, also be possible to seal rigid plates in accordance with this invention prior to the application of the adsorbents, but normally, thicker polymer plates are not employed in layer chromatography.

The substrate film advantageously is oxide coated and provided with the adsorbent layer in a fully continuous process, since this ensures economical production and uniform quality. Advantageously, conventional laminating machines with roll application systems are employed, the plastic film being rolled off at a uniform speed. The ester solution can be applied, for example, with the aid of a metering roll, very uniformly and in a thin layer thickness, on one or both sides. The film web thereafter advantageously passes through a heatable tunnel in which the desired relative humidity and temperature can adjustably be controlled. During this process, the solvent first evaporates. Then, under the influence of temperature and atmospheric humidity, hydrolysis takes place, and the hydrolysis products are polymerized to the desired thin, coherent, adherent coating. After leaving the tunnel, the thus-coated plastic film can likewise be provided with the desired adsorbent layer in a fully continuous manner.

The novel chromatographic films can be employed in all cases in which layer chromatography, particularly thin-layer chromatography, is employed. The handling of these films does not differ from that of conventional film substrates.

In the examples which follow, any of the coated films described in Group A can be coated with a chromatographic adsorbent layer in accordance with any example of Group B.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

(A) Pretreatment of the plastic films

Example 1.—A roll of polyterephthalate film ("Hostaphan" film R 190 or N 190 of Kalle A.G., Wiesbaden-Biebrich), thickness 190$\mu$, width 200 mm., and length about 400 m., is unrolled over rolls at a speed of about 2 m./minute. The web is first passed through a bath of a 2% solution of n-butyl titanate in a mixture of 25 parts by volume of n-butanol and 75 parts by volume of petroleum ether (boiling range 100–140° C.) and then dried in air.

Thereafter, in a hot air drying tunnel heated to about 115° C., steam at the same temperature is directed by nozzles onto the film from above. During this procedure, the n-butyl titanate is hydrolyzed. The web is then dried with hot air at about 115° C. for about 1 minute, and then rolled up to give a film coated with polymeric titanium dioxide (about 70 g./1,000 m.$^2$).

Example 2.—A polyterephthalate film ("Hostaphan" R 190, 190$\mu$ in thickness, manufacturer: Kalle A.G., Wiesbaden-Biebrich) is dipped into a solution of 2 g. of tetrabutyl zirconate in 100 ml. of butanol. The film is removed from the bath and the solution is allowed to drip off. The film is then dried for 1 hour at room temperature in air and, to hydrolyze the zirconate, is briefly drawn over a boiling water bath (about ½ minute). Thereafter, the film is dried for one hour at 115° C. to give a film coated with about 100 g./1,000 m.$^2$ of polymeric zirconium dioxide.

Example 3.—A film of nylon 6 polyamide (polycaprolactam) (thickness: 100$\mu$) is dipped into a solution of 1 g. of polymeric butyl titanate in 100 ml. of butanol. The film is removed from the bath, allowed to drip off for one hour, pulled over a steam bath analogously to Example 2, and thereafter dried for 45 minutes at 105° C. The film is coated with about 300 g./1,000 m.$^2$ of titanium dioxide.

Example 4.—A 200$\mu$ thick film of polyoxymethylene ("Delrin") is treated in the same manner as in Example 3 with a solution of 2 g. of polymeric butyl titanate in 100 ml. of propanol and hydrolyzed to give a coherent coating of polymeric titanium dioxide (about 150 g./1,000 m.$^2$).

Example 5.—A polyterephthalate film having a thickness of 190$\mu$ is dipped into a solution having one of the compositions set forth in the following table. The film is allowed to drip off, dried at room temperature, exposed to humid air over a steam bath for about 30–50 minutes (65% relative atmospheric humidity), and dried for 2 hours at 110° C. A transparent, coherent coating of titanium dioxide is thus obtained.

| Ti compound | G./100 ml. | Solvent |
| --- | --- | --- |
| Tetrabutyl titanate | 2.0 | Butanol. |
| Tetraisopropyl titanate | 1.7 | Iso-propanol. |
| 2-ethylhexyl titanate | 4.0 | Butanol/petroleum ether (25:75 parts by volume). |
| n-Propyl titanate | 1.5 | n-Propanol. |

Example 6.—A polyester film, thickness 190$\mu$ ("Hostaphan" R 190, Kalle A.G., Wiesbaden-Biebrich) is dipped into a solution of 2 g. of tetramenthyl titanate in 100 ml. of a mixture of butanol/petroleum ether (1:3). The plastic film is removed from the bath, allowed to drip dry, and then treated for one hour at a temperature of 110° C. with steam-containing air (80% relative humidity). A coherent, adherent coating of polymeric titanium dioxide is obtained (about 70 g./1,000 m.$^2$).

Example 7.—A polyester film according to Example 1 is dipped into a bath containing a solution of tetralinaloyl titanate (2 g. in 100 ml. of butanol/petroleum ether, 1:3), and provided with a protective coating of polymeric TiO$_2$ in the same manner as set forth in Example 6.

Example 8.—A polyester film is provided with a protective coating of polymeric titanium dioxide in the same manner as described in Example 6, by employing a solution of 2.6 g. of tetracyclohexanyl titanate in 100 ml. of a mixture of petroleum ether/butanol (75:25).

(B) Coating of the pretreated plastic films

Example 1.—A plastic film pretreated in accordance with any of the examples described in (A), e.g., Example 1, is mechanically coated with an aqueous suspension of a medium-pore-size silica gel having a particle size around 20μ, containing 2% manganese-activated zinc silicate and 5% polyvinyl alcohol, and thereafter dried. The layer thickness is 250μ. The coated film is cut into webs of 5 m. length or into film strips 40 x 20 cm., 20 x 20 cm., 10 x 20 cm., or 5 x 20 cm.

Example 2.—A plastic film pretreated in accordance with any of the examples described in (A) is mechanically coated with an aqueous suspension of a large-pore silica gel having a particle size around 20μ, containing 3% lead-manganese-activated calcium silicate and 5% of a customary binder, and thereafter dried. The layer thickness is 200μ. The band is cut into film strips 20 x 20 cm.

Example 3.—A plastic film pretreated according to any of the examples described in (A) is coated mechanically with an aqueous suspension of a small-pore silica gel having a particle size of between 5 and 20μ, as well as 20% of kieselguhr, with the addition of 4% of copper zinc sulfide and 5% of a customary binder, and thereafter dried. The layer thickness is 250μ. The band is cut into webs having a length of 5 m., or into film strips 20 x 20 cm.

Example 4.—A plastic film pretreated in accordance with any of the examples described in (A) is mechanically coated with an aqueous suspension of kieselguhr, containing 4% manganese-activated zinc silicate and 5% polyvinyl alcohol as the binder, and thereafter dried. The layer thickness is 200μ. The band is cut into film strips 20 x 20 cm.

Example 5.—A plastic film pretreated according to any of the examples described in (A) is mechanically coated with an aqueous suspension of aluminum oxide (particle size about 5-30μ), containing 2% manganese-activated zinc silicate and 3% of a customary binder, and thereafter dried. The layer thickness is 200μ. The band is cut into film strips 40 x 20 cm., 20 x 20 cm., 10 x 20 cm., and 5 x 20 cm.

Example 6.—A plastic film pretreated according to any of the examples described in (A) is mechanically coated with an aqueous suspension of a magnesium trisilicate having a particle size of around 20μ, containing 2% manganese-activated zinc silicate and 5% polyvinyl alcohol as the binder, and thereafter dried. The layer thickness is 200μ. The band is cut into film strips 20 x 20 cm.

In the same manner, tricalcium phosphate (pentacalcium-hydroxide triphosphate, hydroxylapatite) can be applied as the adsorbent coating.

Example 7.—A plastic film pretreated in accordance with any of the examples described in (A) is mechanically coated with an aqueous suspension of magnesium oxide containing 5% of a conventional binder, and thereafter dried. The layer thickness is 200μ. The band is cut into film strips 20 x 20 cm.

Example 8.—A plastic film pretreated in accordance with any of the examples described in (A) is mechanically coated with an aqueous suspension of a microcrystalline cellulose having a particle size of around 20μ, and thereafter dried. The layer thickness is 100μ. The band is cut into webs of 5 m. length, or into film strips 40 x 20 cm., 20 x 20 cm., 10 x 20 cm., and 5 x 20 cm.

Example 9.—A plastic film pretreated in accordance with any of the examples described in (A) is mechanically coated with an aqueous suspension of a polyethylenimine cellulose containing 2% of a manganese-activated zinc silicate as a fluorescence indictor, and thereafter dried. The layer thickness is 100μ. The band is cut into film strips 20 x 20 cm. The strips are employed as anion exchangers.

Example 10.—A plastic film pretreated in accordance with any of the examples described in (A) is mechanically coated with a methanolic-aqueous suspension (30:70 parts by volume) of polyaminoundecanoic acid containing 2% manganese-activated zinc silicate and 1% sodium carboxymethylcellulose as the binder, and thereafter dried. The layer thickness is 150μ. The band is cut into film strips 20 x 20 cm.

Example 11.—A plastic film pretreated in accordance with any of the examples described in (A) is mechanically coated with a suspension of cellulose monoacetate, having a particle size of about 20μ, in methanol/water (30:70), and thereafter dried. The layer thickness is 100μ. The band is cut into film strips 20 x 20 cm.

Example 12.—A plastic film pretreated in accordance with any of the examples described in (A) is mechanically coated with a methanolic-aqueous suspension (30:70 parts by volume) of silanized silica gel having a particle size of around 20μ containing 2% of a manganese-activated zinc silicate and a conventional binder, and thereafter dried. The layer thickness is 200μ. The band is cut into film strips 20 x 20 cm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thin-layer chromatographic film comprising a flexible plastic film substrate which contains chromatographic solvent extractable material; a chromatographic adsorbent coating comprising a binder and an adsorbent; and an intermediate coherent adherent layer less than 1μ thick of a member of the group consisting of polymeric titanium dioxide, polymeric zirconium dioxide and mixtures thereof, between the surface of the film substrate and the chromatographic adsorbent coating thereon, which seals the surface of the film substrate, said binder being different than said intermediate coherent layer, the latter being insoluble in water and organic solvents.

2. A film according to claim 1 wherein the intermediate coherent layer is polymeric titanium dioxide.

3. A film according to claim 1 wherein the plastic film is a polyester.

4. A film according to claim 1 wherein the intermediate coherent layer is a hydrolysis product of an organotitanate or an organozirconate.

5. A film according to claim 4 wherein the intermediate coherent layer is a hydrolysis product of a monomeric or a polymeric alkyl titanate.

6. A film according to claim 5 wherein the alkyl titanate is a butyl titanate.

7. A film according to claim 4 wherein the intermediate coherent layer is the hydrolysis product of one or more of menthyl titanate, cyclohexanyl titanate or linaloyl titanate.

8. A film according to claim 1 wherein the substrate is coated on both sides with the intermediate coherent layer and the adsorbent coating.

9. A film according to claim 1 wherein the intermediate coherent layer contains 5–2,000 g. of $TiO_2$ per 1,000 m.$^2$ of substrate.

10. A film according to claim 9 wherein the intermediate coherent layer contains 30–100 g. $TiO_2$ per 1,000 m.$^2$ of substrate.

11. A film according to claim 1 wherein the intermediate coherent layer contains 5–3,000 g. of $ZrO_2$ per 1,000 m.$^2$ of substrate.

12. A film according to claim 11 wherein the intermediate coherent layer contains 40–150 g. of $ZrO_2$ per 1,000 m.$^2$ of substrate.

13. A film according to claim 1 wherein the chromatographic adsorbent is selected from the group consisting of silica gel, aluminum oxide and cellulose adsorbents.

14. A film according to claim 1 wherein the adsorbent is silica gel, the film substrate is a polyester, and the intermediate coherent layer is polymeric titanium dioxide.

References Cited

UNITED STATES PATENTS

| | | | |
|---|---|---|---|
| 3,498,830 | 3/1970 | Slining | 117—47 A |
| 2,768,909 | 10/1956 | Haslam | 117—124 T |
| 3,418,158 | 12/1968 | Perry et al. | 210—31 C |
| 2,943,955 | 7/1960 | Brill | 117—124 T |
| 2,838,418 | 6/1958 | Starkweather | 117—124 T |
| 2,980,719 | 4/1961 | Haslam | 117—124 T |
| 3,542,588 | 11/1970 | Heidbrink | 210—198 C |
| 3,418,152 | 12/1968 | Staudenmayer et al. | 210—31 C |
| 3,303,043 | 2/1967 | Halpaap et al. | 117—33.5 R |

WILLIAM D. MARTIN, Primary Examiner

M. SOFOCLEOUS, Assistant Examiner

U.S. Cl. X.R.

117—4, 68, 76 F, 138.8 R, F, N; 210—31 C, 198 C